US009942967B2

(12) United States Patent
Chraibi et al.

(10) Patent No.: US 9,942,967 B2
(45) Date of Patent: Apr. 10, 2018

(54) CONTROLLING LIGHTING DYNAMICS

(71) Applicant: PHILIPS LIGHTING HOLDING B.V., Eindhoven (NL)

(72) Inventors: Sanae Chraibi, Eindhoven (NL); Jonathan David Mason, Waalre (NL); Dzmitry Viktorovich Aliakseyeu, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/529,267

(22) PCT Filed: Nov. 12, 2015

(86) PCT No.: PCT/EP2015/076375
§ 371 (c)(1),
(2) Date: May 24, 2017

(87) PCT Pub. No.: WO2016/083136
PCT Pub. Date: Jun. 2, 2016

(65) Prior Publication Data
US 2017/0265279 A1 Sep. 14, 2017

(30) Foreign Application Priority Data
Nov. 24, 2014 (EP) .................................. 14194438

(51) Int. Cl.
H05B 37/02 (2006.01)
H05B 39/04 (2006.01)
H05B 41/36 (2006.01)

(52) U.S. Cl.
CPC ..... *H05B 37/0227* (2013.01); *H05B 37/0272* (2013.01)

(58) Field of Classification Search
None
See application file for complete search history.

(56) References Cited

U.S. PATENT DOCUMENTS

2013/0120238 A1 5/2013 Spaulding et al.
2016/0088707 A1* 3/2016 Van De Sluis
 et al. .................. H05B 37/0227
 315/149

(Continued)

FOREIGN PATENT DOCUMENTS

EP 2651190 A2 10/2013
WO 2012001566 A1 1/2012

(Continued)

OTHER PUBLICATIONS

"Interactive Visions," https://www.youtube.com/watch?v=cee4pm, Aug. 2013 (1 Page).

(Continued)

*Primary Examiner* — Anh Tran
(74) *Attorney, Agent, or Firm* — Meenakshy Chakravorty

(57) ABSTRACT

A method of controlling a lighting system comprising one or more illumination sources to render a dynamic lighting scene, the method comprising: receiving a first user input to select one or more colors for the lighting scene; receiving a second user input to select a dynamic effect for the lighting scene; and rendering the lighting scene with the one or more colors and the dynamic effect based on the first and second user inputs respectively; wherein the second user input comprises the user performing a motion with a mobile user terminal, and the receiving of the second user input comprises detecting the motion of the mobile user terminal.

14 Claims, 3 Drawing Sheets

(56) References Cited

U.S. PATENT DOCUMENTS

2016/0120009 A1* 4/2016 Aliakseyeu ........ H05B 37/0272
　　　　　　　　　　　　　　　　　　　　315/131
2016/0205748 A1* 7/2016 Lashina ............. H05B 33/0851
　　　　　　　　　　　　　　　　　　　　315/130

FOREIGN PATENT DOCUMENTS

| WO | 2013085600 A2 | 6/2013 |
| WO | 2014181205 A2 | 11/2014 |
| WO | 2015092631 A1 | 6/2015 |

OTHER PUBLICATIONS

Anonymous, "Lightjames—DMX Lighting Controller Software," http://web.archive.org/web/20141027170115, Oct. 2014 (3 Pages).

* cited by examiner

CONTROLLING LIGHTING DYNAMICS

CROSS-REFERENCE TO PRIOR APPLICATIONS

This application is the U.S. National Phase application under 35 U.S.C. § 371 of International Application No. PCT/EP2015/076375, filed on Nov. 12, 2015, which claims the benefit of European Patent Application No. 14194438.9, filed on Nov. 24, 2014. These applications are hereby incorporated by reference herein.

TECHNICAL FIELD

The present disclosure relates to the control of dynamic effects in a lighting system comprising one or more illumination sources.

BACKGROUND

"Connected lighting" refers to lighting systems in which illumination sources are controlled not by a traditional, manually-operated mechanical switch between the mains and each illumination source (or not only by such a switch), but by a means of a more intelligent controller which connects to the illumination sources of the system either via a direct wireless data connection with each illumination source (e.g. via ZigBee) or via a wired or wireless data network (e.g. via a Wi-Fi network, 3GPP network or Ethernet network). For instance the controller may take the form of an application running on a user terminal such as a smartphone, tablet, or laptop or desktop computer.

Currently, such systems enable users to set static light scenes that may comprise white light, coloured light, or both. In order to allow such scenes to be created, the controller must present the user with a suitable set of controls or user interface. In one example, the controller enables the user to select an illumination source or group of such sources, and to manually input one or more parameters of the light to be emitted by that illumination source or group, e.g. to set a numerical value for the overall intensity of the emitted light and/or to set individual numerical values for the red, green and blue (RGB) components of the light. However, inputting numerical values in this manner is not very user friendly. In another, more user-friendly example, the controller presents the user with a picture such as a photograph, e.g. one chosen by the user, and enables the user to select a point in the photograph from which to pick a colour, e.g. by dragging and dropping a lamp icon onto the picture. The controller then sets the light output of the scene so as to correspond to the colour at the selected point in the picture. Using such methods a static scene can be easily created.

Some connected lighting systems may also include a dynamics engine to allow users to create dynamic lighting scenes as well, i.e. scenes in which the emitted light varies with time. Dynamic lighting is becoming increasingly popular, both for applications in the home and in professional domains such as the office, hospitality and retail.

However, creating dynamic lighting is not a straightforward task for non-professional users (i.e. users who are not professional lighting engineers). Many current systems are limited in terms of how users are required to assign light transitions, and how best to distribute the effects over multiple illumination sources. Existing methods of accepting a user input to create a dynamic lighting effect rely on the metaphor of a timeline on which the user can define effects that then play out. These often repeat and, if there are multiple luminaries, the user must assign a sequence or design to multiple timelines, one for each of the different illumination sources. This is can be a time consuming process that does not always result in pleasing dynamics. Some mobile applications control dynamics by applying a random colour generator, or by allowing the user to drag-and-drop a colour picker over video content. However, the results are still often displeasing and/or repetitive.

SUMMARY

It would be desirable to provide a method by which a non-professional end-user, unskilled in lighting, can define a dynamic lighting scene of his or her own in a user-friendly, intuitive manner. Setting a dynamic scene is more complex than a static one, as the light output of each illumination source will vary over time. As mentioned, one known idea uses video content to provide the colour and the motion for the light, but this direct translation is not always pleasing as it may be too repetitive or meaningless. Also, the user must still find a video that contains both the colours and the motion that he or she likes, which may take a great deal of searching or may not even be possible at all.

It would be desirable to provide a user-friendly approach for setting lighting dynamics. To this end, the disclosed approach provides a new input means for controlling dynamic lighting by accepting a user input through the motion of a mobile user terminal.

According to one aspect disclosed herein there is provided a method of controlling a lighting system comprising a plurality of illumination sources to render a dynamic lighting scene, the method comprising: receiving a first user input to select one or more colours for the lighting scene; receiving a second user input to select a dynamic effect for the lighting scene; and rendering the lighting scene with the one or more colours and the dynamic effect based on the first and second user inputs respectively, the rendering comprising controlling each of the plurality of illumination sources; wherein the second user input comprises the user performing a motion with a mobile user terminal, and the receiving of the second user input comprises detecting said motion of the mobile user terminal; wherein said motion is performed over a period of time, and the detection of said motion comprises recording data representing the motion accumulated over said period of time; and wherein after said time period, the control of the plurality of illumination sources to render said lighting scene is performed based on the recorded data. This may mean playing out the dynamic lighting scene just after the motion is completed, or at some later time or date (e.g. later in the day or a subsequent day).

Thus the end user is provided with a means of defining his or her own dynamic lighting settings, using expressions that are more familiar, natural or comfortable to the user in order to communicate the preferred parameters for a dynamic light scene to the system. In embodiments, the user input may be provided in a single fluid motion. For example, this motion could be a quick circular movement, a gentle swirl or a combination of slow and rapid movements.

In embodiments, the detection of said motion may comprise detecting a rapidness of the motion, and the rendering of the lighting scene may comprise setting a rapidness of the dynamic effect based on the detected rapidness of said motion. For example, rapid movement may be translated into sudden colour changes in the dynamic scene, while a gentle swirl might be translated into a continuous but very slow colour change.

Alternatively or additionally, the detection of said motion may comprise detecting a rhythm of the motion, and the rendering of the lighting scene may comprise setting a rhythm of the dynamic effect based on the detected rhythm of said motion.

Alternatively or additionally, the detection of said motion may comprise detecting a shape of a path traced out by said motion, and the rendering of the lighting scene may comprise setting the dynamic lighting effect based on the two-dimensional or three-dimensional shape of said path.

Alternatively or additionally, the detection of said motion may comprise detecting a direction of the motion relative to the user, and the rendering of the lighting scene may comprise setting the dynamic effect based on the detected direction of said motion. For example, moving the mobile user' terminal toward the user's self may create a dynamic effect whereby the light increases the brightness The detection of said motion may be performed (at least in part) using one or more motion sensors of the mobile user terminal, such as one or more accelerometers, gyroscopes, tilt sensors, and/or compasses. Alternatively or additionally, the detection of said motion may be performed (at least in part) by analysing an image captured by a camera of the mobile user terminal, e.g. by tracking an object using image recognition, and/or by analysing motion vectors or a residual between frames, and/or by reference to coded light signals detected in the image. As another example, the detection of said motion may be alternatively or additionally be performed (at least in part) by reference to reference signals communicated between the mobile user terminal and nodes of location network such as an indoor location network (e.g. beacon signals from beacons such as a Wi-Fi beacons, iBeacons or illumination sources emitting coded light).

In embodiments, the receipt of the first user input may comprise receiving a user input picking one or more colours from an image, and the rendering of the lighting scene comprises setting each of the one or more colours of the lighting scene to a respective one of the one or more colours picked from said image. For example this image may be captured by a camera of said mobile user terminal.

In further embodiments, the lighting system may comprise a plurality of illumination sources arranged to emit light for illuminating a scene, the lighting system being operable to vary a colour and an intensity of the light at each of an array of locations over at least two spatial dimensions of the scene; and the rendering of the lighting scene may comprise setting the colour and/or dynamic effect differently at different ones of said locations.

In one particular realisation of such embodiments, the receipt of the first user input may comprise receiving a user input picking a colour from each of a plurality of selected positions in the image; and the rendering of the lighting scene may comprise mapping a plurality of the different ones of said locations to different respective ones of the selected positions in said image, and setting the colours at said plurality of locations to the colours picked from the respective positions in the image mapped to said plurality of locations.

According to another aspect of the present disclosure, there is provided a computer program embodied on one or more computer-readable storage media and configured so as when run on said user terminal to perform a method in accordance with any of the embodiments disclosed herein.

According to another aspect of the present disclosure, there is provided a mobile user terminal configured to perform a method in accordance with any of the embodiments disclosed herein.

According to yet another aspect, there is provided a system comprising: a lighting system comprising a plurality of illumination sources for rendering a dynamic lighting scene; and a mobile user terminal configured to receive a first user input to select one or more colours for the lighting scene, to receive a second user input to select a dynamic effect for the lighting scene, and to control the lighting system to render the lighting scene with the one or more colours and the dynamic effect based on the first and second user inputs respectively, the rendering comprising controlling each of the plurality of illumination sources; wherein the second user input comprises the user performing a motion with a mobile user terminal, the mobile user terminal being configured to receive the second user input by detecting said motion of the mobile user terminal; wherein said motion is performed over a period of time, and the detection of said motion comprises recording data representing the motion accumulated over said period of time; and wherein after said time period, the control of the plurality of illumination sources to render said lighting scene is performed based on the recorded data. In embodiments, the system may be further configured in accordance with any of the embodiments disclosed herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1A:
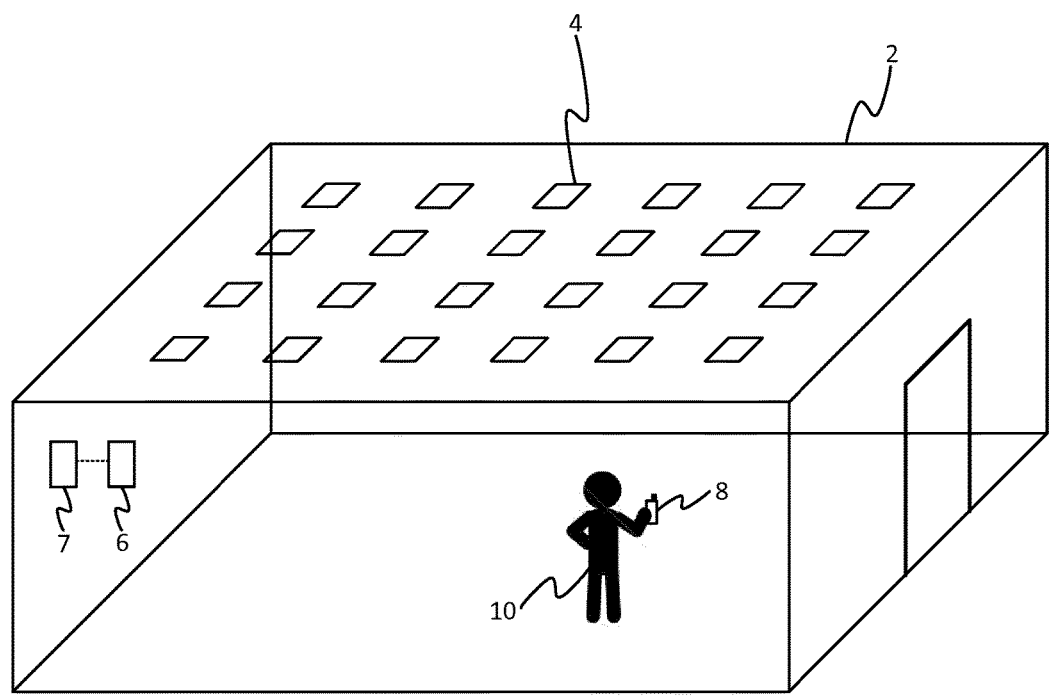
FIGS. 1a and 1b each give a schematic representation of a space comprising a lighting system.
Figure 1B:
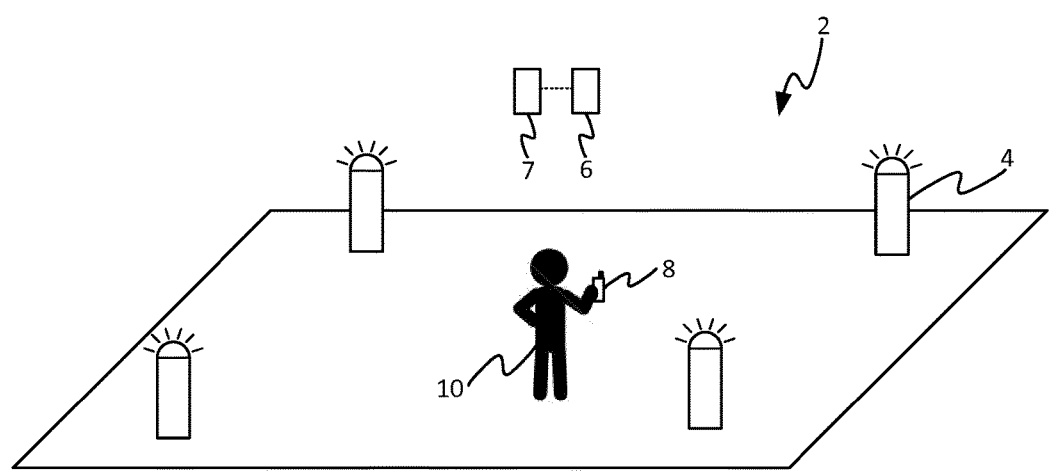

FIGS. 1a and 1b each illustrate a different example of a lighting system in accordance with embodiments disclosed herein. In each case the lighting system comprises a plurality of luminaires 4 disposed at different respective locations throughout an environment 2. For example the environment 2 may comprise in indoor space such as the interior of a room or concert hall, as shown in FIG. 1; or an outdoor space such as a park or garden, as shown in FIG. 1b; or a partially covered space such as a stadium. Each of the luminaires 4 is a different physical device comprising one or more lamps (i.e. one or more illumination sources). Each of these luminaires 4 may be fixedly installed at its respective location, or may be a free-standing unit. The luminaires 4 are arranged so as together to illuminate a scene within the environment 2, thereby creating a lighting scene. Note that each of the terms "luminaire", "lamp" or "illumination source" refers specifically to a device which emits not just any light, but specifically illumination, i.e. light on a scale suitable for contributing to the illuminating of an environment 2 occupied by humans (so that the human occupants can see within the environment 2, and optionally also to create a lighting atmosphere within the environment 2). A luminaire 4 is a device comprising one or more lamps (i.e.

illumination sources) plus associated socket, housing and/or support. A lamp or illumination source may take any of a number of different possible forms such as an LED-based illumination source (comprising one or more LEDs), traditional incandescent bulb, gas-discharge lamp (e.g. fluorescent tubes), etc. Further, a luminaire 4 may take various forms such as a traditional ceiling or wall mounted room lighting, or a floor-standing or table-standing unit, or a less traditional form such as an LED-strip embedded in a wall or furniture.

Each of the luminaires 4 is a connected luminaire in that it comprises a receiver configured to receive data from a user terminal 8 for controlling the luminaire 4, and optionally may also comprise a transmitter configured to transmit data back to the user terminal 8 such as for providing acknowledgements or status updates. The user terminal 8 comprises a corresponding transmitter and optionally receiver respectively. The user terminal 8 takes the form of a mobile user terminal, such as a smartphone, tablet or laptop. It is installed with a lighting control application which is configured so as when run on the user terminal 8 to use one or more transmitters of the user terminal 8 to send data in the form of lighting control commands to each of the luminaires 4 in order to individually control the light that each emits, e.g. to switch the light on and off, dim the light level up and down, and/or to adjust the colour of the emitted light. The lighting control application may optionally also use the receiver of the user terminal 8 to receive data in the other direction from the luminaires 4, e.g. to receive an acknowledgement in response to a control command, or a response to a control command that requested a status update rather than controlling the emitted light.

This communication between the application on the user terminal 8 and each of the luminaires 4 may be implemented in a number of ways. Note that the transmission from user terminal 8 to luminaire 4 may or may not be implemented in the same way as any transmission from luminaire 4 to user terminal 8. Note also that the communication may or may not be implemented in the same way for the different luminaires 4. Further, the communications may be implemented wirelessly or over a wired connection, or a combination of the two. As the user terminal 8 is a mobile terminals, in preferred embodiments the communication will be wireless, but the option of a wired connection in the form of a flexible cable is not excluded. Some examples are set out below, each of which may in embodiments be used to implement any of the communications discussed herein. In each case the user terminal 8 may be described as communicating with the luminaires 4 via a wireless and/or wired network comprising at least the user terminal 8 and luminaires 4 (and in embodiments other network infrastructure).

In some embodiments, the user terminal 8 is configured to communicate directly with each of one or more of the luminaires 4, i.e. without communicating via an intermediate node. For example, the user terminal 8 may be a wireless terminal configured to communicate directly with each of the luminaires 4 via a wireless channel, e.g. a ZigBee channel, thus forming a wireless network directly between the user terminal 8 and luminaires 4. In another example, the user terminal 8 may be configured to communicate directly with the luminaires over a wired network, such as a DMX network if the user terminal 8 is itself a DMX controller.

Alternatively or additionally, the user terminal 8 may be configured to communicate with each of one or more of the luminaires 4 via at least one intermediate node in the form of at least one bridge, gateway, hub, proxy or router 6. For example, the user terminal 8 may be a wireless terminal configured to communicate with such luminaires 4 via a wireless router, e.g. a Wi-Fi router, thus communicating via a wireless network such as a Wi-Fi network comprising the wireless router 6, user terminal 8 and luminaires 4. As another example, the intermediate node 6 may comprise a wired router such as an Ethernet router, the user terminal 8 being configured to communicate with the luminaires 4 via a wired network such as an Ethernet network comprising the wired router, user terminal 8 and luminaires 4. In yet another example, the intermediate node 6 may be a DMX proxy.

In further alternative or additional embodiments, the user terminal 8 may be configured to communicate with each of one or more of the luminaires 4 via an intermediate node in the form of a centralized lighting control unit 7. Such communication may or may not occur via a router 6 or the like, e.g. Wi-Fi router (and the connection between the control unit 7 and router 6 may be wired or wireless). Either way, the control unit 7 receives control commands from the user terminal 8, and forwards them to the relevant one or more luminaires 4 to which the commands are directed. The control unit 7 may be configured with additional control functionality, such as to authenticate whether the user terminal 8 and/or its user 10 is/are entitled to control the lights 4, and/or to arbitrate between potentially conflicting commands from multiple users. Note therefore that the term command as used herein does not necessarily imply that the command is acted on unconditionally (though that is not excluded either). Note also that in embodiments, the commands may be forwarded to the destination luminaire 4 in a different format than received from the user terminal 8 (so the idea of a sending a command from user terminal 8 to luminaire 4 refers herein to sending the substantive content or meaning of the command, not its particular format or protocol).

Thus by one or more of the above means, the user terminal 8 is provided with the ability to communicate with the luminaires 4 in order to control them remotely, including at least to control the light they emit. It will be appreciated that the scope of the disclosure is not limited to any particular means of communication.

By whatever means the communication is implemented, the lighting control application on the user terminal 8 must present the user 10 of that terminal with a suitable interface, for selecting the manner in which the user 10 desires that the light emitted by the luminaires 4 is controlled.

However, as discussed above, creating dynamic lighting is not a simple task for a non-professional. For example, existing methods rely on the metaphor of timelines on which the user can add effects that then play out, but these often repeat and if there are multiple luminaires then the user must assign a sequence or design to multiple timelines for different respective ones of the luminaires. This can be a time consuming process that does not always results in pleasing dynamics. Other known techniques include use of video content to provide the colour and the motion for the light or the use of a random colour generator with a motion type, but such direct translations are not always pleasing, e.g. as they may be too repetitive or meaningless.

According to embodiments disclosed herein, the end user is provided with a means of defining his or her own dynamic lighting settings, in a single user action, that are non-repetitive and unique using expressions familiar to him or her, such as visuals (pictures) and movement to communicate the preferred parameters for a dynamic light scene to the system. This is achieved by use of a camera to capture the colours from surrounding environment, and sensor or camera motion when capturing the environment to define how captured colours are rendered by the lighting system. In this way the dynamic lighting scene can be generated in a single user action, and based on what was captured by the camera and how the camera or terminal was moved during the capturing.

In embodiments, a user is enabled to set a dynamic scene in one fluid motion, by following these steps:

(i) the user moves the camera phone to capture parts of the surrounding environment (i.e. "picking up" the colours from the environment); and (ii) the colours captured by the camera are then translated into colours used in the dynamic scene while speed and rhythm of the movement will determine the light dynamics and colour transitions. As an example of various movements, this could be a quick circular movement, a gentle swirl or a combination of slow and rapid movements. For example rapid movement may be translated into sudden colour changes in the dynamic scene, while a gentle swirl might be translated into a continuous but very slow colour change.

Figure 2:
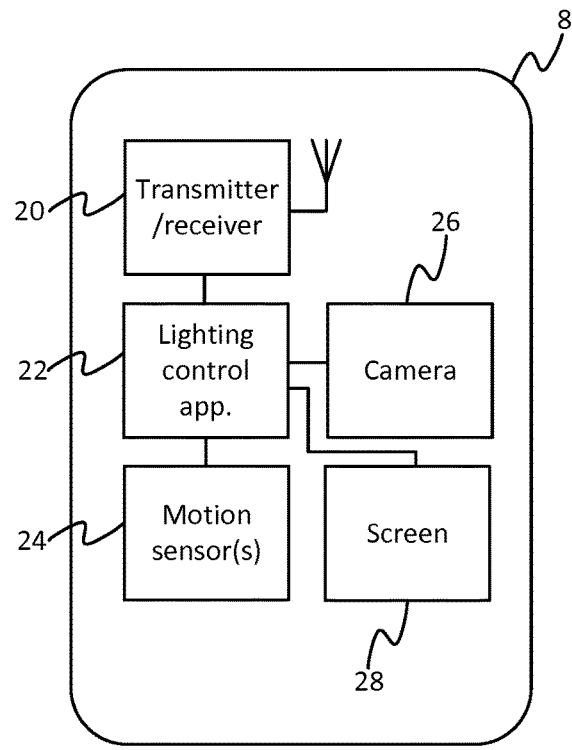
FIG. 2 is a schematic block diagram of a mobile user terminal.

FIG. 2 illustrates an example of the mobile terminal 8 in accordance with embodiments disclosed herein. The mobile terminal 8 comprises an interface 20 comprising at least a transmitter for transmitting control commands to the luminaires 4 according to any of the communication techniques discussed above (and in embodiments the interface 20 may also comprise a receiver for receiving data back from the luminaires 4 in accordance with any of the communication techniques discussed above). The mobile terminal 8 also comprises a lighting control application 22 operatively coupled to the interface 20, arranged to control the luminaires 4 via the transmitter of the interface 20, again as discussed above. The lighting control application 22 is implemented in code stored on one or more storage media of the mobile device 8 and arranged to run on one or more processors of the mobile device 8 (e.g. as executable code, or an applet running in a browser of the mobile terminal 8). Alternatively it is not excluded that the same functionality could be implemented in dedicated hardware circuitry, or a combination of hardware and software, but the following will be described in terms of an application 22 by way of illustration.

The mobile terminal 8 may further comprise one or more motion sensors 24, one or more cameras 26 and/or a screen 28, each operably coupled to the lighting control application 22.

The lighting control application 22 is configured to receive two separate user inputs from the user 10: a first user input for selecting one or more colours of the lighting scene to be created in the environment 2, and a second user input for selecting a dynamic for the scene—i.e. a scheme according to which the lighting scene will vary over time.

In embodiments, the lighting control application 22 is configured to receive the first user input by allowing the user 10 to pick a colour from an image. For instance this image may be a (still) photograph or a video, and in embodiments this may be a photograph or video captured by the camera 26 (or one of the cameras 26) of the mobile terminal 8.

To allow the user 10 to pick a colour from the image, the application 22 displays a colour image to the user 10 via the screen 28 of the user terminal 8, and the user 10 selects a point or area within the image. The application 22 then samples the colour from that point or area (e.g. an average or other combination of the colour values in the area) and sets the colour of the light output of one or more of the luminaires 4 to this colour. In embodiments, the user 10 may be provided with the option of selecting one or more of the luminaires 4 or one or more locations illuminated by the luminaires 4 (e.g. where the selected location could be illuminated by a combination of the light from two or more of the luminaires 4), and the user 10 may be enabled to pick a respective colour from the image for each of the luminaires 4 or locations.

Regarding the second user input, the lighting control application 22 is configured to receive this by using the motion sensor(s) 24 and/or camera 26 (or one of the cameras) of the mobile device 8.

In embodiments using one or more motion sensors 24, the motion sensor(s) 24 are arranged to sense physical motion of the mobile device 8 in one, two or preferably three dimensions. For example the motion sensor(s) 24 may comprise one or more of: an accelerometer based sensor, a gyroscope based sensor, a tilt sensor and/or a compass. E.g. the sensor(s) 24 may comprise a three-axis accelerometer for sensing acceleration of the mobile device 8 in each of three dimensions. The lighting control application 22 is configured to receive sensor data from the motion sensor(s) 24 and to detect one or more properties of the motion of the user terminal 8 based on this sensor data.

Alternatively or additionally, in embodiments using a camera 26, the lighting control application 22 is configured to detect the motion of the mobile terminal 8 by analysing video captured by the camera 26 (which could be the same camera 26 used for the colour picking or a different camera). This analysis could for example be based on image recognition techniques, whereby an algorithm identifies an object in the video and then tracks its movement over time; and/or based on other motion analysis techniques, e.g. by analysing motion vectors and/or a residual signal between frames of the video, and/or analysing the position of one or more coded light components in the light captured in the image (coded light being information embedded in the light at a frequency high enough to be substantially imperceptible to the human eye, but often detectable by a camera such as a rolling shutter camera as found in most smartphones and tablets).

Another option would be that, alternatively or additionally, the lighting control application 22 is configured to detect the motion of the mobile terminal 8 by reference to a location network (by means of a process such as triangulation, trilateration, multilateration and/or fingerprinting based on these signals). For example, device-centric case a number of beacon nodes may be disposed throughout the environment 2, each arranged to emit a beacon signal which can be detected by the transceiver 20 of the mobile user terminal 8. E.g. the beacons could be Wi-Fi nodes, iBeacons, or even some or all of the luminaires 4 themselves each having a different respective ID embedded into the light it emits by means of coded light. In a network centric case, the mobile user terminal 8 instead transmits a reference signal that can be detected at a plurality of suitable nodes for the purpose of localization.

Either way, the lighting control application 22 is configured detect motion of the user terminal 8 resulting from a gesture performed by the user 10 while holding or wearing the mobile terminal 8 (or by any other means having the mobile terminal 8 disposed about a moving part of the user's body); and in dependence on this to control the dynamic effect of the light scene being created through the luminaires 4, e.g. by controlling a manner in which the intensity of the light varies with time. In some embodiments, all the luminaires 4 in the array may emit with the same dynamic at the same time. Alternatively the manner in which the light varies may be different for different ones of the luminaires 4 at different locations in the array, or as another example, different ones of the luminaires 4 may be controlled with the same dynamic pattern but offset in time relative to one another.

Using either the sensor(s) 24 and/or camera 26, the lighting control application 22 may be configured to detect one or more properties of this motion, and to control the dynamic effect based on the detected properties. For instance, it may be configured to detect a measure of rapidness of the motion (any measure of the quickness of the motion, e.g. velocity, speed, acceleration or magnitude of acceleration), and the rapidness of the dynamic effect set for the lighting scene may be dependent on this (any measure of rate of change of the effect with time, e.g. rate of change of intensity and/or one or more colour channels, and/or speed, velocity, acceleration or magnitude of acceleration of a motion of a lighting effect). E.g. if the user 10 moves the terminal 8 swiftly then the application 22 sets a light scene that rapidly fades up or down in intensity, whereas if the user 10 moves the terminal 8 more slowly then the application 22 sets a more slowly fading scene.

Alternatively or additionally, the lighting control application 22 may be configured to detect a rhythm of the motion (e.g. a period), and to set the dynamic based on this. E.g. if the user 10 moves the terminal 8 back and forth at a high rate then the application 22 sets a light scene that fades up and down frequently, while if the user 10 moves the terminal 8 back and forth at a lower rate then the application 22 sets a less a scene which fades up and down less frequently.

Figure 4:
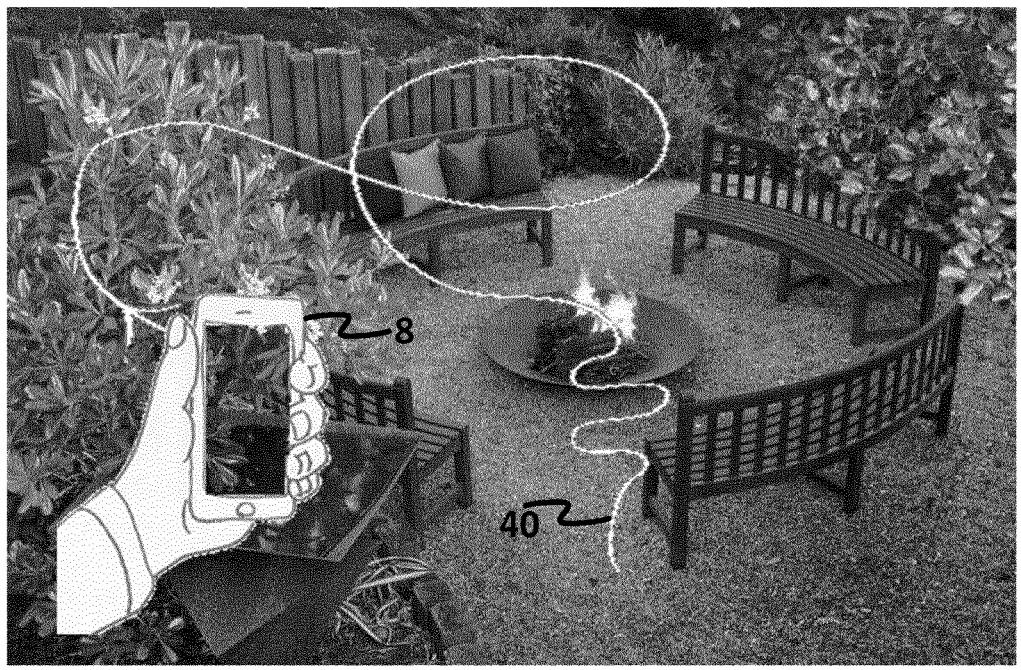

As another alternative or additional example, the lighting control application 22 may be configured to trace the shape of a path 40 travelled by the mobile device 8 (e.g. see FIG. 4). This could be the two-dimensional shape in some plane, or the three dimensional shape. E.g. different shaped paths (corresponding different gestures that may be performed by a user 10) may be mapped to different ones of a set of predetermined dynamic lighting effects, and the application 22 may select the effect mapped to the performed gesture.

As yet another alternative or additional example, the lighting control application 22 may be configured to determine a direction of the motion relative to the user 10. E.g. the application 22 may be configured so that moving the mobile user terminal 8 toward the user 10 creates a dynamic effect with the light increasing the brightness.

In some embodiments the first user input (e.g. colour picking) may only set the colour, whilst the second input (motion) only sets the dynamic. That is, the first user input does not affect the dynamic and the second user input does not affect the colour.

Alternatively, the second user input may for example affect the colour as well, e.g. the motion performed by the user 10 may set not (or nor only) how the intensity varies but also how the colour varies. For instance, the user 10 may select a certain colour from an image (e.g. blue) and the dynamic may cause the spectrum of emitted light to oscillate around the selected colour (e.g. between turquoise and indigo).

Note also: in embodiments, the lighting control application 22 does not just react "on the fly" to motion of the mobile terminal 8, but rather it records a complete gesture (by accumulating sensor data and/or video date from the sensor(s) 24 and/or camera 26 respectively). E.g. it records the path, or records multiple shakes back and forth to record a rhythm, or detects movement over a period of time to record speed or acceleration. The application 22 then implements the corresponding dynamic effect only after the relevant features of the whole gesture have been detected.

This may comprise playing out the dynamic scene immediately after the user has performed the gesture, or storing an indication of the selected scene for play out at some later time or on some later occasion (e.g. later in the day or a subsequent day).

Some particular example embodiments will now be discussed with reference to FIGS. 3, 4, 5a and 5b.

As discussed, there are different elements that together will set the dynamic light output, and these elements can be interpreted and applied using the integrated sensor(s) 24 and/or camera 26 of a smart device (the user terminal 8). In embodiments, the lighting control application 22 will allow the user 10 to set a dynamic scene in one fluid motion as follows.

Firstly, the user activates the dynamic scene creation feature which will activate the camera 26 of the smart device 8 and start the video capturing. The user 10 will then be asked to move the smart device 8 (e.g. phone) such that the camera 26 captures parts of the surrounding environment that the person would like to be used for creation of the dynamic light effect (i.e. "picking up" the colours from the environment).

Secondly, the colours captured by the camera 26 are then translated into colours used in the dynamic scene, while a speed and rhythm of the movement performed using the smart device 8 will determine the light dynamics and colour transitions. For example this could be a quick circular movement, a gentle swirl or a combination of slow and rapid movements. See for example FIG. 4. For instance, rapid movement may be translated into sudden colour changes in the dynamic scene, while a gentle swirl might be translated into a continuous but very slow colour change.

Figure 5A:
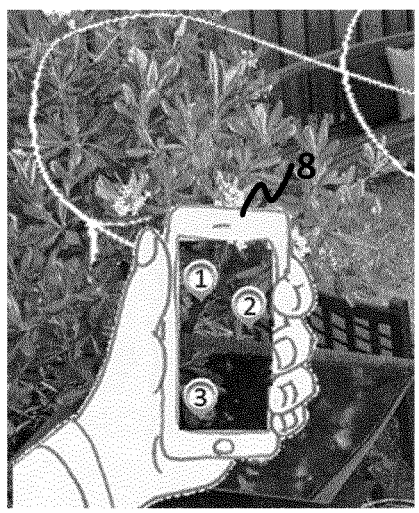
Figure 5B:

Depending on the number of luminaires 4, the user 10 might explicitly identify the position of selected luminaires 4 on the screen 28 before capturing the image (see FIG. 5a), and use his or her finger or thumb to indicate an "area of interest" from which colours are desired to be picked up (see FIG. 5b). This may comprise the lighting control application 22 picking up the exact colour of a pixel under the lamp icon (FIG. 5a) or under the user's finger or thumb (FIG. 5), or alternatively in some case the application 22 may select a nearby colour as more appropriate, e.g. in situations where the colour that is exactly under the icon, finger or thumb cannot be rendered by the lighting system 4. In other words, in some cases one or more properties of the lighting system 4 may also be taken into account in the definition of the dynamic scene.

As yet another alternative, the system may automatically assign colours based on the way the user 10 moved the smart device 8 (e.g. phone) during the capturing step (an optionally also in dependence on the number of the luminaires 4 present in the environment 2).

Figure 3:
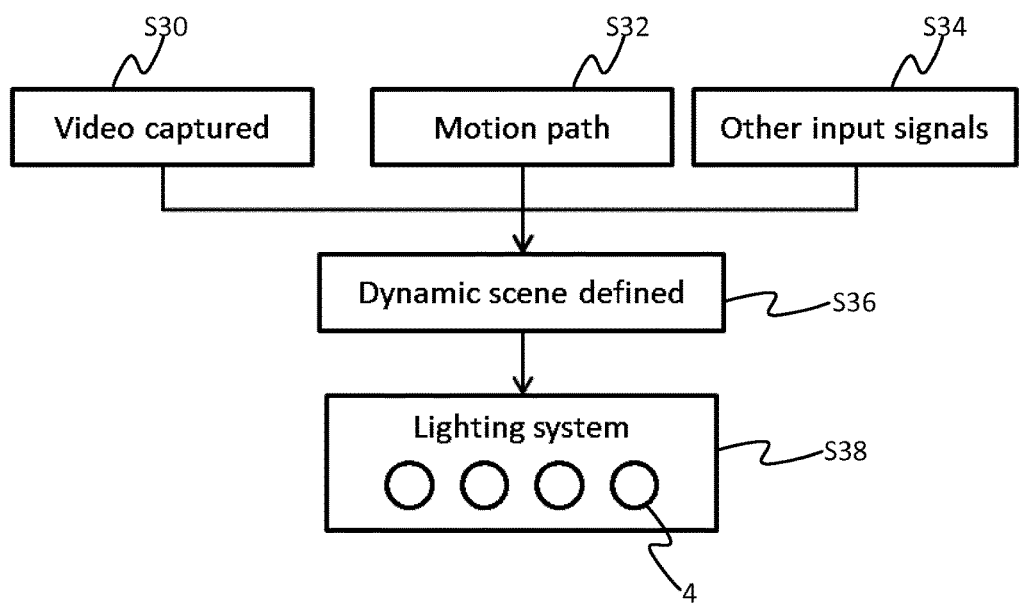
FIG. 3 is a schematic representation of a process for rendering a dynamic lighting scene, FIG. 4 schematically illustrates a mobile user terminal being used to select a colour and dynamic for rendering a dynamic lighting scene, and FIGS. 5a and 5b schematically illustrate a mobile user terminal selecting an area of interest.

Different ways of generating dynamic scenes from the camera and motion input can be defined. FIG. 3 gives a flow chart illustrating an example process. At step S30, the system receives the input from the camera 26, and at step S32 it receives the input from the motion sensor(s) 24 such as the accelerometer. At step S34 the system possibly receives input from other sensors. Note these steps S30, S32 and S34 do not have to occur in any particular order. At step S36 these inputs are transferred into a dynamic scene, and at step S38 the dynamic scene is then rendered by the lighting system 4. The following describes two examples of how such a transformation can be done.

As a first example, the motion of the camera 26 can be linked directly to the video captured. For instance, in FIG. 4, if the user 10 moved very slowly over the fire in the garden, this may indicate that he or she liked these colours and effects, and thus when translated into the lighting dynamics, the dynamics would be slow when this orangey, fiery part of the dynamic is rendered but speed up when the rest of the garden is played. Or more of the dynamic may contain the orange content. In this example, the motion and colour picking are directly linked to each other.

As a second example, the motion of the camera 26 can be disconnected from the video content. This means that the motion of the user's hand informs the algorithm of the type of dynamic he or she would like (fast, slow, jumpy etc.) and the video content provides the colour information only.

As a possible extension, other sensors of the smart device 8 could be used to set dynamic light. For instance, using the microphone of the smart device 8, the input for dynamic light could be extended to sound. E.g. the rhythm in the sound of the rain could be translated into the rhythm of the dynamic light. A sound measurement could be taken and saved or applied to one or a group of the luminaires 4. As another example, a light sensor may be used as an extra input for the light dynamics. Based on the environmental light, the translation could be made to influence the dynamics (speed, rhythm, colour, CCT) to suit the environment.

It will be appreciated that the above embodiments have been described only by way of example.

For instance, the colour and dynamic elements may be set in one action as described in the embodiments above, but alternatively the colour and dynamic elements could be set separately and combined with earlier created and saved pre-sets.

Further, the video capturing and motion capturing does not necessarily have to be done by the same device, and in alternative embodiment these can instead be performed by two different devices. For example the video capturing may be performed by using a pair of smart-glasses, while the motion capturing may be performed by means of a hand motion with the smart watch.

Note also that colour may be controlled in a number of ways, such as RGB (red-green-blue) values, colour temperature, CRI (colour rendering index), or saturation of a specific colour while maintaining a general colour of illumination. The scope of the disclosure is not limited in this respect.

Further, while in the above the array of lighting locations corresponds to the locations at which the luminaires 4 are installed or disposed, alternatively the array of different possible lighting locations could be achieved by luminaires 4 that are at different locations than the location being illuminated, and even by a different number of luminaires 4 than possible lighting locations in the array. For example, the luminaires 4 could be movable spotlights or luminaires with beam-forming capability whose beam directions can be controlled by the lighting control application.

Further, note that while above the control of the luminaires 4 has been described as being performed by a lighting control application 22 run on a user terminal 8 (i.e. in software), in alternative embodiments it is not excluded that such control functionality could be implemented for example in dedicated hardware circuitry, or a combination of software and dedicated hardware. Note also that the application 22 could represent a combination of constituent applications, e.g. a lighting application for sending commands to the luminaires 4 plus a plug-in or other cooperating application for detecting motion and/or receiving colour-picking selections from images.

The invention claimed is:

1. A method of controlling a lighting system comprising one or more illumination sources to render a dynamic lighting scene, the method comprising:
   receiving a first user input to select one or more colours for the lighting scene;
   receiving a second user input to select a dynamic effect for the lighting scene; and
   rendering the lighting scene with the one or more colours and the dynamic effect based on the first and second user inputs respectively, the rendering comprising controlling each of the one or more illumination sources;
   wherein the receipt of the first user input comprises using a camera of a mobile user terminal to pick up colours from a surrounding environment;
   wherein the second user input comprises the user performing a motion with a mobile user terminal, and the receiving of the second user input comprises detecting said motion of the mobile user terminal while picking up said colours from the environment;
   wherein said motion is performed over a period of time, and the detection of said motion comprises recording data representing the motion accumulated over said period of time; and
   wherein after said time period, the control of the one or more illumination sources to render said lighting scene is performed based on the recorded data.

2. The method of claim 1, wherein the detection of said motion comprises detecting a rapidness of the motion, and the rendering of the lighting scene comprises setting a rapidness of the dynamic effect based on the detected rapidness of said motion.

3. The method of claim 1, wherein the detection of said motion comprises detecting a rhythm of the motion, and the rendering of the lighting scene comprises setting a rhythm of the dynamic effect based on the detected rhythm of said motion.

4. The method of claim 1, wherein the detection of said motion comprises detecting a shape of a path traced out by said motion, and the rendering of the lighting scene comprises setting the dynamic lighting effect based on the shape of said path.

5. The method of claim 1, wherein the detection of said motion may comprise detecting a direction of the motion relative to the user, and the rendering of the lighting scene may comprise setting a property of the dynamic effect based on the detected detection of said motion.

6. The method of claim 1, wherein:
   the detection of said motion is performed using one or more motion sensors of the mobile user terminal;
   the detection of said motion is performed by analysing an image captured by a camera of the mobile user terminal; and/or
   the detection of said motion is performed based on reference signals communicated between the mobile user terminal and nodes of a location network.

7. The method of claim 6, wherein the detection of said motion is performed at least in part using one or more motion sensors of the mobile user terminal, and wherein the one or more motion sensors comprise one or more accelerometers, gyroscopes, tilt sensors, and/or compasses.

8. The method of claim 1, wherein the receipt of the first user input comprises receiving a user input picking one or more colours from an image, and the rendering of the lighting scene comprises setting each of the one or more colours of the lighting scene to a respective one of the one or more colours picked from said image.

9. The method of claim 8, wherein the image is captured by a camera of said mobile user terminal.

10. The method of claim 1, wherein the one or more illumination sources are
- a plurality of illumination sources of the lighting system arranged to emit light for illuminating a scene, wherein the lighting system being operable to vary a colour and an intensity of the light at each of an array of locations over at least two spatial dimensions of the scene; and
- the rendering of the lighting scene comprises setting the colour and/or dynamic effect differently at different ones of said locations.

11. The method of claim 8, wherein:
- the receipt of the first user input comprises receiving a user input picking a colour from each of a plurality of selected positions in the image; and
- the rendering of the lighting scene comprises mapping a plurality of the different ones of said locations to different respective ones of the selected positions in said image, and setting the colours at said plurality of locations to the colours picked from the respective positions in the image mapped to said plurality of locations.

12. A computer program embodied on one or more computer-readable storage media and configured so as when run on said user terminal to perform the method of claim 1.

13. The mobile user terminal for controlling the lighting system of claim 1, the mobile user terminal is configured to communicate with each of one or more of illumination sources via a lighting control unit and is configured to perform the method of claim 1.

14. A system comprising:
- a lighting system comprising one or more illumination sources for rendering a dynamic lighting scene; and
- a mobile user terminal configured to receive a first user input to select one or more colours for the lighting scene, to receive a second user input to select a dynamic effect for the lighting scene, and to control the lighting system to render the lighting scene with the one or more colours and the dynamic effect based on the first and second user inputs respectively, the rendering comprising controlling each of the one or more illumination sources;

wherein the receipt of the first user input comprises using a camera of the mobile user terminal to pick up colours from a surrounding environment;

wherein the second user input comprises the user performing a motion with the mobile user terminal, the mobile user terminal being configured to receive the second user input by detecting said motion of the mobile user terminal while picking up said colours from the environment;

wherein said motion is performed over a period of time, and the detection of said motion comprises recording data representing the motion accumulated over said period of time; and wherein after said time period, the control of the one or more illumination sources to render said lighting scene is performed based on the recorded data.

* * * * *